2,934,432

TREATMENT OF COTTONSEED MEALS TO REMOVE RESIDUAL PIGMENTS

William H. King and Vernon L. Frampton, Metairie, and Aaron M. Altschul, New Orleans, La., assignors to the United States of America as represented by the Secretary of Agriculture No Drawing. Application January 9, 1958
Serial No. 708,052

1 Claim. (Cl. 99—2)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to treating cottonseed meals, using as starting materials the meals remaining after the usual commercial oil extraction of cottonseed meals, to remove residual gossypol and other biologically active pigments in the meals without causing detrimental changes in the cottonseed protein, thus to produce meals suitable for feeding to laying hens without causing eggs produced by the hens to become discolored upon storage.

In order for cottonseed meals to be fed to chickens in unrestricted amounts, without producing this discoloration in the eggs, the biologically available, or free gossypol content of the meals (as determined by the A.O.C.S. Tentative Method Ba7–55) must be reduced to extremely low levels, much lower than are achieved by the usual commercial procedure of oil extraction in use today. The present process may be applied directly to the usual commercially produced meal to remove the free gossypol to the desired degree.

In general, according to the present invention, the meal is contacted with an excess of an organic primary amine for at least five minutes, thereby to convert gossypol and gossypol-like pigments that may be present in the meal to derivatives which are soluble in the relatively nonpolar organic solvents such as liquid hydrocarbons like benzene, hexane, heptane, etc., and the liquid chlorinated hydrocarbon like chloroform, phenyl chloride, etc.

The contacted meal is then extracted with the indicated solvent which removes the gossypol derivatives as well as any of the unused organic primary amine. No other treatment of the meal is required. The process thus eliminates the need for severe mechanical or similar treatments designed to rupture the gossypol cells as a requisite in removal of the gossypol.

The types of amines which may be used in the instant process are any primary organic amines capable of reacting with the naturally occurring chemically modified residual free gossypol referred to above under mild conditions of temperature, at normal moisture content (3 to 12%), to form derivatives which are soluble in the relatively nonpolar organic solvents. Conversion of the various forms of residual free gossypol to the amine derivatives provides the means for their removal from the cottonseed meal by extraction with the said solvents.

Any primary organic amine of the general formula:

$$R-NH_2$$

where "R" is a saturated or unsaturated aliphatic group such as heptyl or oleyl or an aryl group such as toluyl or phenyl, and the like may be used. The above types of primary organic amines include, among others the alkylamines such as pentylamine, hexylamine, heptylamine, octylamine, nonylamine, decylamine, dodecylamine, octadecylamine, etc., or unsaturated alkylenamines such as oleylamines, linoleylamine, octadecenylamine, octadecadienylamine, etc., and the arylamines such as phenylamine, toluylamine, xylylamine, naphthylamine, etc.; or any mixture of any two or more of the above classes of primary amines, either straight-chained or branched-chained with or without other substituent groups in the molecule. The preferred amines are those of sufficiently high molecular weight to readily react with the residual forms of free gossypol at moderate temperatures to form derivatives which are readily soluble in the nonpolar organic solvents as described above to facilitate their removal from the cottonseed meal after reaction by extraction with the aforementioned solvents. Liquid amines or solutions of solid or liquid amines in nonpolar organic solvents may be employed.

A particular advantage of this invention is the complete removal not only of the reaction products of the cottonseed pigments and amines but also of the excess amine over that required for reaction with the pigments. The extracts (excess amine reactant as well as the reaction products) can be reused, recycled repeatedly, and finally recovered and purified by crystallization. The unreacted amines in the extract may be purified by distillation or crystallization and the particular solvent used in the extraction can be recovered and purified by conventional methods.

The time of contact between the treating amines and the meal can vary over wide limits (from 5 to 60 minutes or even longer) depending upon the temperature employed and upon the amount of pigment in the meal undergoing treatment. The reaction can be facilitated by mild agitation during the treatment with amines. The amine treatment can be carried out at room temperature or at higher temperatures. Preferably temperatures ranging from ambient (room) temperature to temperatures of about 150° F. are used. The lower tempertures are preferred in order to protect the protein in the cottonseed from heat denaturation and consequent destruction of the nutritive value of the meal treated. The operable amines may be essentially pure in the case of amines that are liquid at the treatment temperature or the amines may be used in solution in a nonpolar solvent. Preferably a weight of liquid amine equal to the weight of the material to be treated is utilized.

If a solution of the amines is to be employed, then a 10 to 90% solution of the reacting amine in a relatively nonpolar organic solvent such as chloroform, hexane, or benzene is employed. The particular amine, mixture of amines, or organic solvent solution of amine utilized may be recirculated and reused in subsequent treatments until such time as the reactive potential of the amine has been exhausted.

The process may be applied to any meal whether produced by pressing, solvent extraction, or prepressed solvent extraction. It is also of no operable consequence whether or not the meals contain adhering solvent in the case of solvent extracted meals. The process is equally applicable to solvent-damp meals or solvent-free meals.

EXAMPLE 1

*Defatted prepress-solvent extracted cottonseed meal with octylamine*

Sixty-seven parts of solvent-damp cottonseed meal (marc from hexane extraction at a commercial prepress-solvent extraction cottonoil mill) containing 50 parts of meal was mixed with 67 parts of octylamine and allowed to stand for 15 minutes at 125° F. The mixture was extracted with chloroform and desolventized by spreading the chloroform-damp marc in contact with the air at 80° F. The free gossypol content of the meal in the marc before treatment was 0.060%. The free gossypol content of the resultant meal, after the above treatment, when analyzed by the A.O.C.S. Tentative Method Ba7–55 for "free gossypol" was found to be 0.007%.

EXAMPLE 2

*Defatted prepress-solvent extracted cottonseed meal with a mixture of aniline and chloroform at ambient temperature*

Sixty-seven parts of prepress-solvent extracted marc as described in Example 1 was slurried with 67 parts of a 50–50 mixture (by volume) of aniline and chloroform and allowed to stand at ambient temperature (80° F.) for 24 hours. The mixture was then extracted with warm chloroform (135° F). and desolventized at ambient temperature by aeration. The free gossypol content of the resultant meal was found to be 0.006%.

EXAMPLE 3

*Defatted prepress-solvent extracted cottonseed meal with a mixture of warm aniline and chloroform*

Sixty-seven parts of prepress-solvent extracted marc as described in Example 1 was slurried with 500 parts of a 50–50 mixture (by volume) of aniline and chloroform and the mixture was held at a temperature of 140–145° F. with gentle agitation for 60 minutes. After filtration the residue was extracted with warm chloroform (135° F.) and desolventized by exposure to the air. The free gossypol content of the resultant meal was 0.000%.

EXAMPLE 4

*Defatted prepress-solvent extracted cottonseed meal with aniline-chloroform extract from Example 3*

The filtrate, consisting of the 50–50 mixture of aniline and chloroform containing the pigment reaction product from the first filtration in Example 3 was slurried with a fresh portion of 67 parts of the marc followed by the treatment described in Example 3. The free gossypool content of the resultant extracted and desolventized meal was 0.000%.

EXAMPLE 5

*Commercial hydraulic-pressed cottonseed meal with octadecylamine and chloroform*

Fifty parts of the cottonseed meal product of a commercial hydraulic-press cottonseed oil mill was warmed for 60 minutes at 140–145° F. in contact with 500 parts of a fifty percent solution (W/V) of octadecylamine in chloroform. After filtration the residue was extracted with chloroform and desolventized by aeration. The free gossypol content of the original meal, before treatment, was 0.100%. The resultant meal after the above treatment contained 0.008% of free gossypol.

EXAMPLE 6

*Commercial screw-pressed cottonseed meal with oleylamine and commercial hexane*

Fifty parts of commercial screw-pressed cottonseed meal containing 0.030% of free gossypol was warmed to 125° F. for 60 minutes with 200 parts of a 50–50 mixture (by volume) of oleylamine and commercial hexane mixture. After filtration the meal was extracted with hexane and then desolventized. The free gossypol content of the resultant meal was 0.005%.

EXAMPLE 7

*Direct solvent-extracted cottonseed meal with aniline and chloroform*

Fifty parts of raw cottonseed meal which had been extracted with hexane and desolventized was allowed to stand in contact with 200 parts of a 50–50 mixture of chloroform and aniline at ambient temperature (80° F.) for 16 hours. The meal was then extracted with chloroform and desolventized. The original meal contained 1.4% of free gossypol. The meal resulting from the above treatment contained 0.002% of free gossypol.

We claim:

A process comprising contacting cottonseed meal with an excess of a primary organic amine for at least 5 minutes, thereby to convert gossypol and gossypol-like pigments to derivatives soluble in nopolar organic solvents, and extracting the contacted meal with a nonpolar organic solvent to remove the produced derivatives and excess primary organic amine.

References Cited in the file of this patent

UNITED STATES PATENTS 2,607,687    Rice _____ Aug. 19, 1952

OTHER REFERENCES

Pons et al.: Jr. Assoc. Off. Agr. Chemists, November 1959, pp. 1068–80.